United States Patent [19]
Bryant

[11] 3,753,309
[45] Aug. 21, 1973

[54] FISHING BOBBER

[76] Inventor: Charles Harry Bryant, 30 Gaffield Avenue, Monument Beach, Mass.

[22] Filed: Feb. 18, 1971

[21] Appl. No.: 116,528

[52] U.S. Cl.................. 43/17.5, 43/41.2, 43/43.11, 43/44.93
[51] Int. Cl. ...................... A01k 93/00, A01k 97/04
[58] Field of Search.............. 43/41.2, 43.11, 44.87, 43/44.88, 44.93, 17.5

[56] References Cited
UNITED STATES PATENTS

| | | | |
|---|---|---|---|
| 2,963,813 | 12/1960 | Graham | 43/43.11 |
| 1,764,738 | 6/1930 | Marsters | 43/41.2 |
| 3,163,957 | 1/1965 | Barrett | 43/41.2 |
| 2,712,197 | 7/1955 | Lewis | 43/43.11 |
| 1,850,748 | 3/1932 | Foster | 43/44.93 |
| 3,255,549 | 6/1966 | Riley | 43/43.11 |

*Primary Examiner*—Russell R. Kinsey
*Assistant Examiner*—Daniel J. Leach
*Attorney*—Martin Kirkpatrick

[57] ABSTRACT

A fishing bobber with an enclosed bait compartment having an upper float portion and a lower bait compartment portion with an open bottom end. The lower bait compartment portion has an external line winding surface for temporarily retaining a wound line thereon by leading a fishing line to it for winding a desired length and from it for retaining the terminal bait carrying portion of the line within the bait compartment. A captured flotatable preferably luminous bait compartment cover is adapted to be releasably retained against the lower edge of the bait compartment portion and releasable cover retaining means are provided including an elastic strand of substantial length extending from the cover to the container and overlapping cooperating release means on the cover and the container. The elastic strand is tensioned with the release means engaged to retain the cover against the lower edge and is released by water contact for removal of the cover to a floating position adjacent the container but connected to it by the strand for visual identification of its release.

9 Claims, 4 Drawing Figures

PATENTED AUG 21 1973　　　　　　　　　　　　　　　3,753,309

FISHING BOBBER

This invention relates to fishing and more particularly to a fishing bobber with an enclosed bait compartment.

Although fishing bobbers capable of protecting live and other bait during casting over long distances are known, they have all proved to be deficient in one or more respects. For example, those which employ open compartments fail to protect the bait during casting, while those which employ covered compartments fail to retain the cover while at the same time providing visual evidence of its having opened to release the bait. Too, such devices have failed to provide adequate line control and storage, particularly when monofilament line is used, so that the bait will not be released with a desired, predetermined length of line upon the bobber striking the water's surface. Other deficiencies reside in the necessity of using sinkers or other weights for operation, which may not be desirable, and in the necessity of using knots for line control, which is not only impractical with monofilament line, but makes it impossible to reel in the line completely without untying the knot.

Accordingly, it is a major object of the present invention to overcome the above and still further deficiencies of the prior art devices while providing a novel fishing bobber with an enclosed bait compartment which can be cast to great distances and there release the bait in a natural manner at the end of a predetermined length of line, at the same time providing visual evidence of such release.

The above and other objects are accomplished according to the present invention by providing a fishing bobber with an enclosed bait compartment comprising an elongated generally cylindrical hollow container having an upper float portion and a lower bait compartment portion with an open bottom end, said upper float portion having a bore therethrough which may include friction means adjacent thereto for leading and frictionally retaining a fishing line passing into said compartment.

According to one aspect of the invention, said lower bait compartment portion has an external generally cylindrical line winding surface for temporarily retaining a wound line on said surface by leading a fishing line from said bore to said line winding surface for winding a desired length thereon and from said line winding surface for retaining the terminal bait carrying portion of said line within said bait compartment.

In another aspect, the invention provides a captured flotatable, preferably luminous, bait compartment cover adapted to be releasably retained against the lower edge of said bait compartment portion and releasable cover retaining means including an elastic strand of substantial length extending from said cover to said container and overlapping cooperating release means on the cover and said lower edge of said container, said elastic strand being tensioned with said release means engaged to retain said cover against said lower edge and being released by water contact for removal of said cover to a floating position adjacent said container but connected thereto by said strand for visual identification of its release. Release of said line terminal bait carrying portion within said bait compartment and said line wound on said line retaining surface then occurs with said line passing through said bore being retained to provide a predetermined length of line extending into the water from said bobber and the natural release of the bait.

For the purpose of more fully explaining the above and still further objects and features of the invention, reference is now made to the following detailed description of a preferred embodiment thereof, together with the accompanying drawings, wherein.

Figure 1:
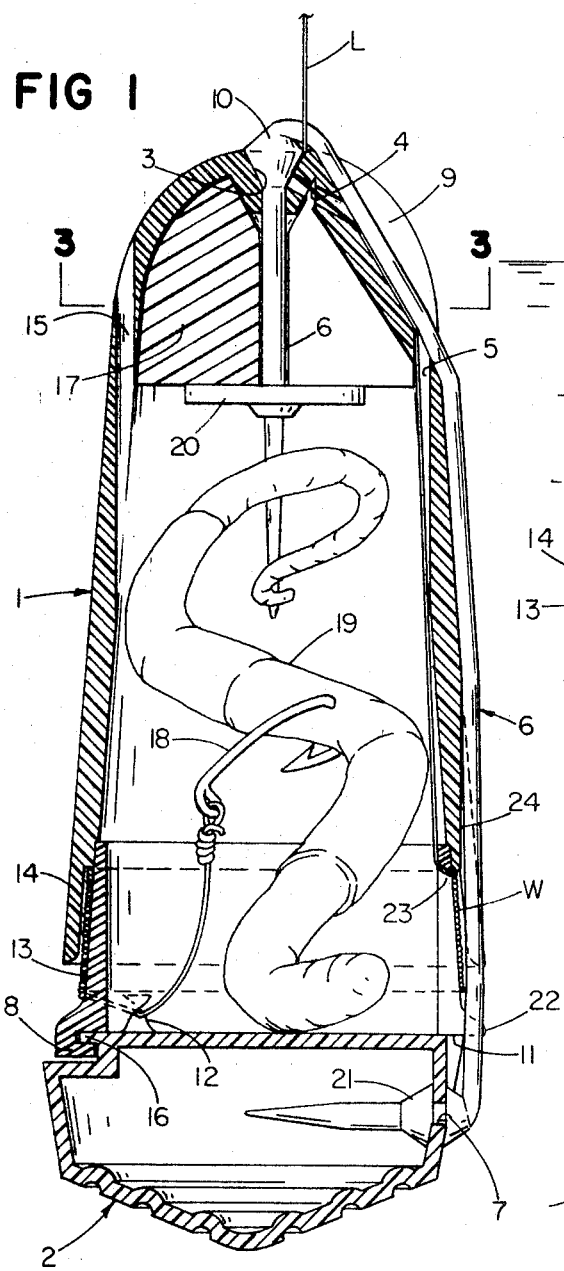
FIG. 1 is a vertical cross-sectional elevational view of the fishing bobber of the invention with its cover secured in casting position.
Figure 2:
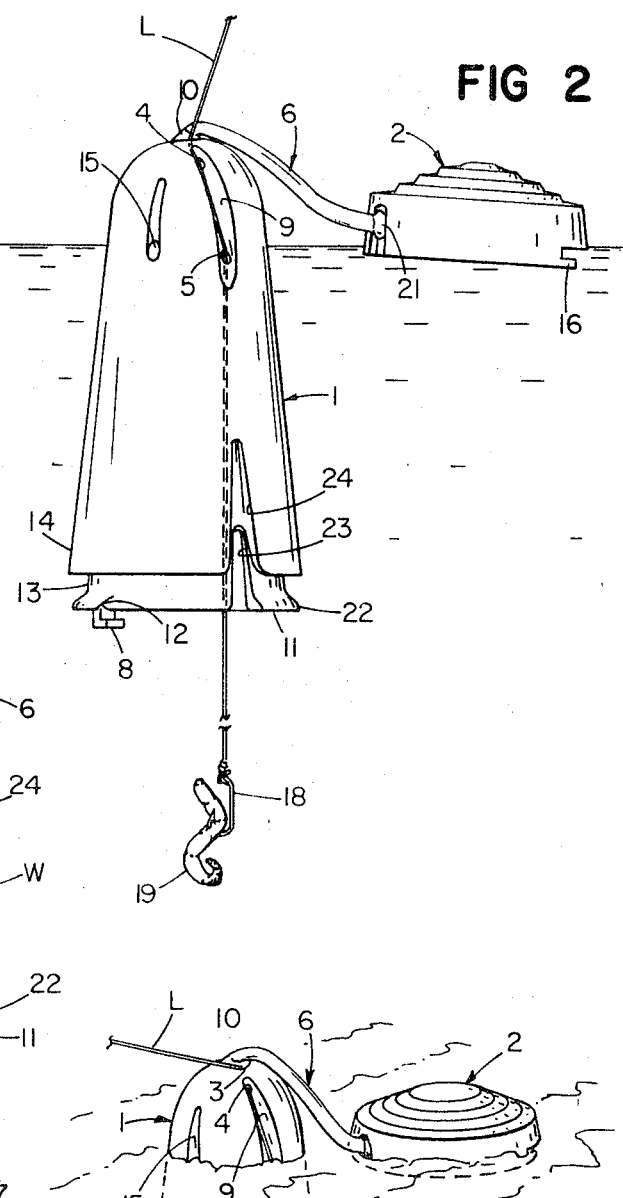
FIG. 2 is a vertical elevational view of the bobber of FIG. 1 with its cover removed for free flotation and bait release.
Figure 3:
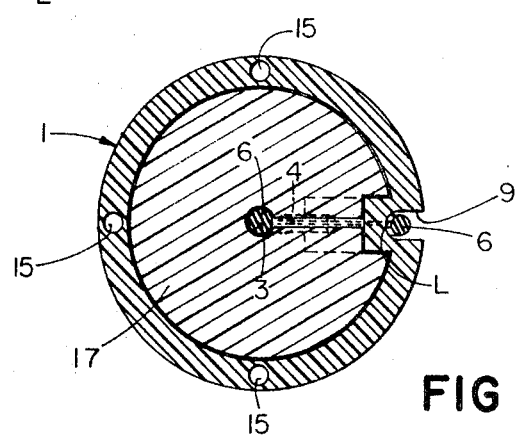
Figure 4:
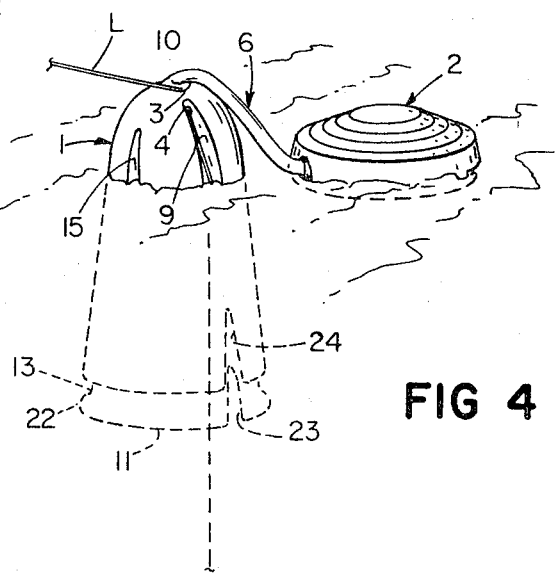

FIG. 3 is a sectional view of the bobber of FIGS. 1 and 2 taken on line 3—3 of FIG. 1; and FIG. 4 is a perspective view of the bobber of FIGS. 1 through 3 floating with its cover floating alongside for visual identification of its release.

Referring to the drawings, the fishing bobber of the invention with its enclosed bait compartment comprises an elongated generally cylindrical hollow container 1, preferably transparent, having an upper float portion with a flotatable material 17, such as styrofoam, therein and a lower bait compartment portion providing a bait compartment with an open bottom peripheral edge 11 provided with a cover 2. The upper float portion has a bore and groove means including friction means, hereinafter more fully explained, for leading and frictionally retaining a fishing line L passing into the bait compartment where the terminal line portion including hook 18 and bait 19 is enclosed.

According to one aspect of the invention, the lower bait compartment portion has an external generally cylindrical line winding surface 13 for temporarily retaining a wound line W on said surface by leading fishing line L from said bore and groove means to said line winding surface for winding a desired length W thereon and from said line winding surface for retaining the terminal bait carrying portion of said line within said bait compartment.

In another aspect, the invention provides a captured flotatable, preferably luminous, bait compartment cover 2 adapted to be releasably retained against the lower edge 11 of said bait compartment portion and releasable cover retaining means including an elastic strand 6 of substantial length extending from said cover to said container and overlapping cooperating release means on the cover and said lower edge of said container.

More specifically, container 1 is provided, at its generally hemispherical upper end with a central axial bore 3 having an upwardly and outwardly tapering conical portion of increasing diameter extending upwardly away from said bottom open end edge 11. A generally tangential longitudinally extending groove 9 is provided on the outer surface of container 1, said groove extending downwardly and outwardly from adjacent the upper end of axial bore 3 at an angle of about 30° thereto. An upper angularly extending bore 4 is provided between the upper end of the bottom of groove 9 and central axial bore 3 and a lower axially extending bore 5 is provided between the lower end of the bottom of groove 9 and the interior of container 1. Axially extending vent bores 15 are also provided for venting the interior of container 1.

The upper end of elastic strand 6 is retained in central axial bore 3, said strand having an enlarged terminal portion 20 positioned beneath material 17 to retain both it and said strand, and having an enlarged intermediate portion 10 fitting within the tapering conical portion of bore 3. Strand 6 extends in stretched tensioned condition throughout the length of bore 3 and from bore 3 along groove 9 and is attached to cover 2 at its bore 7 by means of a lower terminal connector 21 thereon. As so arranged, elastic strand 6 frictionally retains a fishing line L passing through bores 3 and 4, along the bottom of groove 9 and through lower bore 5 into the interior bait compartment of container 1. Such frictional retention occurs at the elastic strand enlargement 10 in bore 3 regardless of the stress of elastic strand 6 therebeyond, and additionally occurs in groove 9 when that portion of strand 6 is in tensioned condition with cover 2 in position against the lower edge 11 of container 1. The tension of either portion of said strand may be adjusted as desired. To releasably so maintain cover 2, overlapping cooperating abutment release means are provided on the opposite side of said cover and edge, including an overlying abutment 8 on said lower edge and an underlying abutment 16 on said cover. Abutments 8 and 16 are of relatively limited extent for sliding release upon the cover striking the water. Cover 2 is hollow so that it will float (FIGS. 2 and 4) for visual identification of its release, and may be luminous for night identification as well. Container 1 is also provided with an external, slightly conical line winding surface 13 having an upper overlying skirt 14 beyond its reduced diameter portion and a lower enlarged stop 22 as well as slots 12 and 23 in the lower edge 11 of the bait compartment portion. Slot 23 extends vertically and provides for leading fishing line L from the interior of container 1, passing from bore 5 closely along the compartment wall to avoid hook and bait entanglement, to line winding surface 13. Slot 12 is provided for leading said line from said surface into the compartment. Slot 24 in skirt 14 overlies slot 23 so that strand 6 will tend to hold the wound line W in position until its release.

To utilize the fishing bobber of the invention, the terminal end of a fishing line L is passed through bores 3 and 4, groove 9 and bore 5 and is pulled through the frictional restraint provided by elastic strand 6 until the desired predetermined length of line is reached. The line is then passed through vertically elongated slot 23, wound around line winding surface 13, and back through slot 12. The conical configuration of surface 13 causes the wound turns W of line L automatically to move upwardly beneath protective skirt 14 better to ensure their retention thereon until the release of cover 2, strand 6 aiding in such retention. The number of turns around surface 13 is determined by the predetermined desired line length. The hook 18 and bait 19 are then attached to said terminal portion and placed in the bait compartment, the line passing into the bait compartment through slot 12. Cover 2 is then positioned against open end edge 11 by tensioning elastic strand 6 and engaging abutments 8 and 16 with one another. The fishing bobber is then ready to be cast.

Upon casting, when the bobber strikes the surface of the water, cover 2 is thereupon released by impact with the water surface to a floating position adjacent said container but connected thereto by said strand for visual identification of its release (FIGS. 2 and 4). Release of the line terminal bait carrying portion within said bait compartment and said line wound on said line retaining surface 13 then occurs with line L being retained in bore 3 by elastic strand 6 to provide a predetermined length of line carrying hook 18 and bait 19 extending into the water from said bobber with the bait being naturally released in an unweighted, natural manner.

For recovery, line L may simply be reeled in, and, in the final stages of recovery, line L can be pulled past the frictional restraint of strand 6 in bore 3 so that the bobber can move down the line to a position adjacent hook 18, and this will occur even if the line be broken adjacent the hook, so that the bobber will not be lost under such circumstances.

What is claimed is:

1. A fishing bobber with an enclosed bait compartment comprising
    an elongated hollow container having an upper float portion and a lower bait compartment portion with an open bottom end having a lower peripheral edge
    said upper flat portion having means for leading and retaining a fishing line passing into said compartment and
    said lower bait compartment portion having
    an external line winding surface having an overlying protective skirt for temporarily retaining a wound line on said surface by leading a fishing line from said bait compartment to said line winding surface for winding a desired length thereon and from said line winding surface for retaining the terminal bait carrying portion of said line within said bait compartment and
    a bait compartment cover adapted to be releasably retained against the lower edge of said bait compartment portion
    whereby to release said line terminal bait carrying portion within said bait compartment and said line wound on said line retaining surface, with said line being retained at said upper float portion to provide a predetermined length of line extending into the water from said bobber.

2. A fishing bobber as claimed in claim 1 further comprising
    releasable cover retaining means including
    an elastic strand of substantial length extending from one side of said cover to said container and
    cooperating release means on said cover and said lower edge of said container
    said elastic strand being tensioned with said release means engaged to retain said cover against said lower edge and being released by water contact for removal of said cover to a position adjacent said container but connected thereto by said strand.

3. A fishing bobber as claimed in claim 2 wherein said cover is flotatable for visual indication of its release.

4. A fishing bobber as claimed in claim 1 wherein said line winding surface is conical of decreasing diameter extending upwardly away from said bottom open end and
    said skirt extends downwardly overlying said surface.

5. A fishing bobber with an enclosed bait compartment comprising
    an elongated hollow container having an upper float portion and a lower bait compartment portion with an open bottom end having a lower peripheral edge said upper float portion having means for leading and retaining a fishing line passing into said compartment including cooperating bore means extending from the exterior of said container generally centrally of the upper end thereof into the interior of said compartment and elastic means positioned in a wall of said compartment in cooperation with said bore means frictionally to retain a fishing line passing through said bore means a bait compartment cover adapted to be releasably retained against the lower edge of said bait compartment portion and releasable cover retaining means whereby to release said line terminal bait carrying portion within said bait compartment, with said line passing through said bore means being retained by said elastic means, to provide a predetermined length of line extending into the water from said bobber.

6. A fishing bobber as claimed in claim 5 wherein said releasable cover retaining means includes an elastic strand of substantial length extending from one side of said cover to said container bore means and overlapping cooperating abutment means on the opposite side of said cover and on said lower edge of said container said elastic strand being tensioned with said abutment means engaged to retain said cover against said lower edge and being released by water contact for removal of said cover to a floating position adjacent said container but connected thereto by said strand.

7. A fishing bobber as claimed in claim 6 wherein the upper end of said container has a groove therein for receiving said tensioned elastic strand.

8. A fishing bobber as claimed in claim 7 wherein said bore means extends from generally centrally of the exterior of said container to the upper end of said groove and from the lower end of said groove to the interior of said container.

9. A fishing bobber with an enclosed bait compartment comprising an elongated generally cylindrical hollow container having an upper float portion and a lower bait compartment portion with an open bottom end having a lower circular edge said upper float portion having an axial bore therethrough including friction means adjacent thereto for leading and frictionally retaining a fishing line passing into said compartment and said lower bait compartment portion having an external generally cylindrical line winding surface for temporarily retaining a wound line on said surface by leading a fishing line from said axial bore to said line winding surface for winding a desired length thereon and from said line winding surface for retaining the terminal bait carrying portion of said line within said bait compartment a captured floatable bait compartment cover luminous for night identification adapted to be releasably retained against the lower edge of said bait compartment portion releasable cover retaining means including an elastic strand of substantial length extending from one side of said cover to said container and overlapping cooperating abutment means on the opposite side of said cover and on said lower edge of said container said elastic strand being tensioned with said abutment means engaged to retain said cover against said lower edge and being released by water contact for removal of said cover to a floating position adjacent said container but connected thereto by said strand for visual identification of its release whereby to release said line terminal bait carrying portion within said bait compartment and said line wound on said line retaining surface, with said line passing through said axial bore being frictionally retained, to provide a predetermined length of line extending into the water from said bobber.

* * * * *